US012684433B2

(12) United States Patent
Zheng et al.

(10) Patent No.: US 12,684,433 B2
(45) Date of Patent: Jul. 14, 2026

(54) CELL GROUP PROCESSING METHOD AND APPARATUS AND COMMUNICATION DEVICE

(71) Applicant: VIVO MOBILE COMMUNICATION CO., LTD., Dongguan (CN)

(72) Inventors: Qian Zheng, Dongguan (CN); Xiaodong Yang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 597 days.

(21) Appl. No.: 18/065,728

(22) Filed: Dec. 14, 2022

(65) Prior Publication Data

US 2023/0110774 A1     Apr. 13, 2023

Related U.S. Application Data

(63) Continuation of application No. PCT/CN2021/100987, filed on Jun. 18, 2021.

(30) Foreign Application Priority Data

Jun. 19, 2020     (CN) .......................... 202010569115.8

(51) Int. Cl.
*H04W 36/00*     (2009.01)
*H04W 76/18*     (2018.01)

(52) U.S. Cl.
CPC ....... *H04W 36/0079* (2018.08); *H04W 76/18* (2018.02)

(58) Field of Classification Search
CPC .. H04W 36/00; H04W 36/0079; H04W 76/18
See application file for complete search history.

(56) References Cited

U.S. PATENT DOCUMENTS

2022/0312282 A1*   9/2022   Chang ............... H04W 36/0079
2023/0239751 A1*   7/2023   Kim ................ H04W 36/00837
                                                                   370/331

FOREIGN PATENT DOCUMENTS

CN          111278168 A      6/2020
WO     WO-2018203710 A1 *  11/2018   ............ H04W 76/19

OTHER PUBLICATIONS

3GPP TSG-RAN WG2 #105bis, R2-1905058. LG Electronics Inc. Xian, China, Apr. 8-12, 2019. Utilization of MCG Failure Recovery via SCG link (Year: 2019).*
3GPP TSG-RAN WG2 #105bis, R2-1905058. LG Electronics Inc. Xian, China, Apr. 8-12, 2019. Utilization of MCG Failure Recovery via SCG link.
3GPP TSG-RAN WG2 Meeting #109-e, R2-2000301. Vivo. Electronic meeting, Feb. 24-Mar. 6, 2020. Fast recovery failure indication.

(Continued)

*Primary Examiner* — Jinsong Hu
*Assistant Examiner* — Farideh Madani
(74) *Attorney, Agent, or Firm* — Stites & Harbison, PLLC; Jeffrey A. Haeberlin

(57) ABSTRACT

Disclosed in this application are a cell group processing method and apparatus and a communication device. The method includes: executing a target process in response to a master cell group (MCG) of a terminal failing in a case that a secondary cell group (SCG) of the terminal is in a suspended state, where the target process is used for requesting to recover at least one of the SCG and the MCG of the terminal.

13 Claims, 3 Drawing Sheets

Execute a target process in response to a master cell group (MCG) of a terminal failing in a case that a secondary cell group (SCG) of the terminal is in a suspended state, where the target process is used for requesting to recover at least one of the SCG and the MCG of the terminal

201

(56) References Cited

OTHER PUBLICATIONS

3GPP TSG-RAN2 Meeting #109-e, R2-2002368. Vivo, Ericsson. Electronic meeting, Feb. 24-Mar. 6, 2020. Running CR to 37.340 for CA/DC enhancements (Change Request).

China National Intellectual Property Administration, International Search Report issued in corresponding Application No. PCT/CN2021/100987.

3GPP TSG RAN WG1 Meeting #99. Reno, USA, Nov. 18-22, 2019. R1-1912286. Nokia, Nokia Shanghai Bell. On Enhancements to Initial Access Procedures for NR-U.

3GPP TSG-RAN WG1 Meeting #92. Athens, Greece, Feb. 26-Mar. 2, 2018. R1-1802967. Ericsson. Text proposal on HARQ-ACK reporting for short TTI and shortened processing.

* cited by examiner

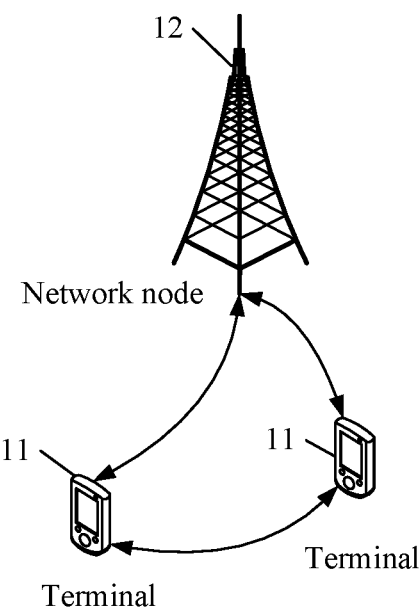

Network node 11    11

Terminal

Terminal

FIG. 1

| Execute a target process in response to a master cell group (MCG) of a terminal failing in a case that a secondary cell group (SCG) of the terminal is in a suspended state, where the target process is used for requesting to recover at least one of the SCG and the MCG of the terminal |
|---|

| Execute a target process in response to a master cell group (MCG) of a terminal failing in a case that a secondary cell group (SCG) of the terminal is in a suspended state, where the target process is used for recovering at least one of the SCG and the MCG of the terminal |
|---|

| Transmit SCG suspension configuration information to a terminal |
|---|

CELL GROUP PROCESSING METHOD AND APPARATUS AND COMMUNICATION DEVICE

CROSS-REFERENCE TO RELATED APPLICATIONS

This application is a continuation of International Application No. PCT/CN2021/100987, filed on Jun. 18, 2021, which claims priority to Chinese Patent Application No. 202010569115.8 filed in China on Jun. 19, 2020, which are incorporated herein by reference in their entireties.

TECHNICAL FIELD

This application belongs to the field of communication technologies, and in particular, relates to a cell group processing method and apparatus and a communication device.

BACKGROUND

Currently, when a master cell group (MCG) fails, a secondary cell group (SCG) may be used for fast recovery if the SCG is not suspended.

However, the related art provides no relevant solution for a cell group recovery if the MCG fails when the SCG is in a suspended state.

SUMMARY

According to a first aspect of the present disclosure, a cell group processing method is provided, which is applied to a terminal and includes:

executing a target process in response to a master cell group (MCG) of the terminal failing in a case that a secondary cell group (SCG) of the terminal is in a suspended state, where the target process is used for requesting to recover at least one of the SCG and the MCG of the terminal.

According to a second aspect of the present disclosure, a cell group processing method is provided, which is applied to a first network node and includes:

executing a target process in response to a master cell group (MCG) of a terminal failing in a case that a secondary cell group (SCG) of the terminal is in a suspended state, where the target process is used for recovering at least one of the SCG and the MCG of the terminal.

According to a third aspect of the present disclosure, a cell group processing method is provided, which is applied to a second network node and includes:

transmitting SCG suspension configuration information to a terminal.

According to a fourth aspect of the present disclosure, a cell group processing apparatus is provided, which is applied to a terminal and includes:

a first execution module, configured to execute a target process in response to a master cell group (MCG) of the terminal failing in a case that a secondary cell group (SCG) of the terminal is in a suspended state, where the target process is used for requesting to recover at least one of the SCG and the MCG of the terminal.

According to a fifth aspect of the present disclosure, a cell group processing apparatus is provided, which is applied to a first network node and includes:

a second execution module, configured to execute a target process in response to a master cell group (MCG) of a terminal failing in a case that a secondary cell group (SCG) of the terminal is in a suspended state, where the target process is used for recovering at least one of the SCG and the MCG of the terminal.

According to a sixth aspect of the present disclosure, a cell group processing apparatus is provided, which is applied to a second network node and includes:

a third transmission module, configured to transmit SCG suspension configuration information to a terminal.

According to a seventh aspect of the present disclosure, a communication device is provided, which includes a processor, a memory, and programs or instructions stored on the memory and executable on the processor, where the programs or the instructions, when executed by the processor, implement the steps of the method in the first aspect, the second aspect, or the third aspect.

According to an eighth aspect of the present disclosure, a readable storage medium storing programs or instructions thereon is provided, where the programs or the instructions, when executed by a processor, implement the steps of the method in the first aspect, the second aspect, or the third aspect.

According to a ninth aspect of the present disclosure, a chip is provided, which includes a processor and a communication interface, where the communication interface is coupled to the processor, and the processor is configured to execute programs or instructions to implement the method in the first aspect, the second aspect, or the third aspect.

BRIEF DESCRIPTION OF THE DRAWINGS

FIG. 1 is a block diagram of a wireless communication system to which embodiments of this application may be applied;

FIG. 2 is a first flowchart of a cell group processing method according to an embodiment of this application;

FIG. 3 is a second flowchart of a cell group processing method according to an embodiment of this application;

FIG. 4 is a third flowchart of a cell group processing method according to an embodiment of this application;

DETAILED DESCRIPTION

Figures 5, 6, 7, 8:
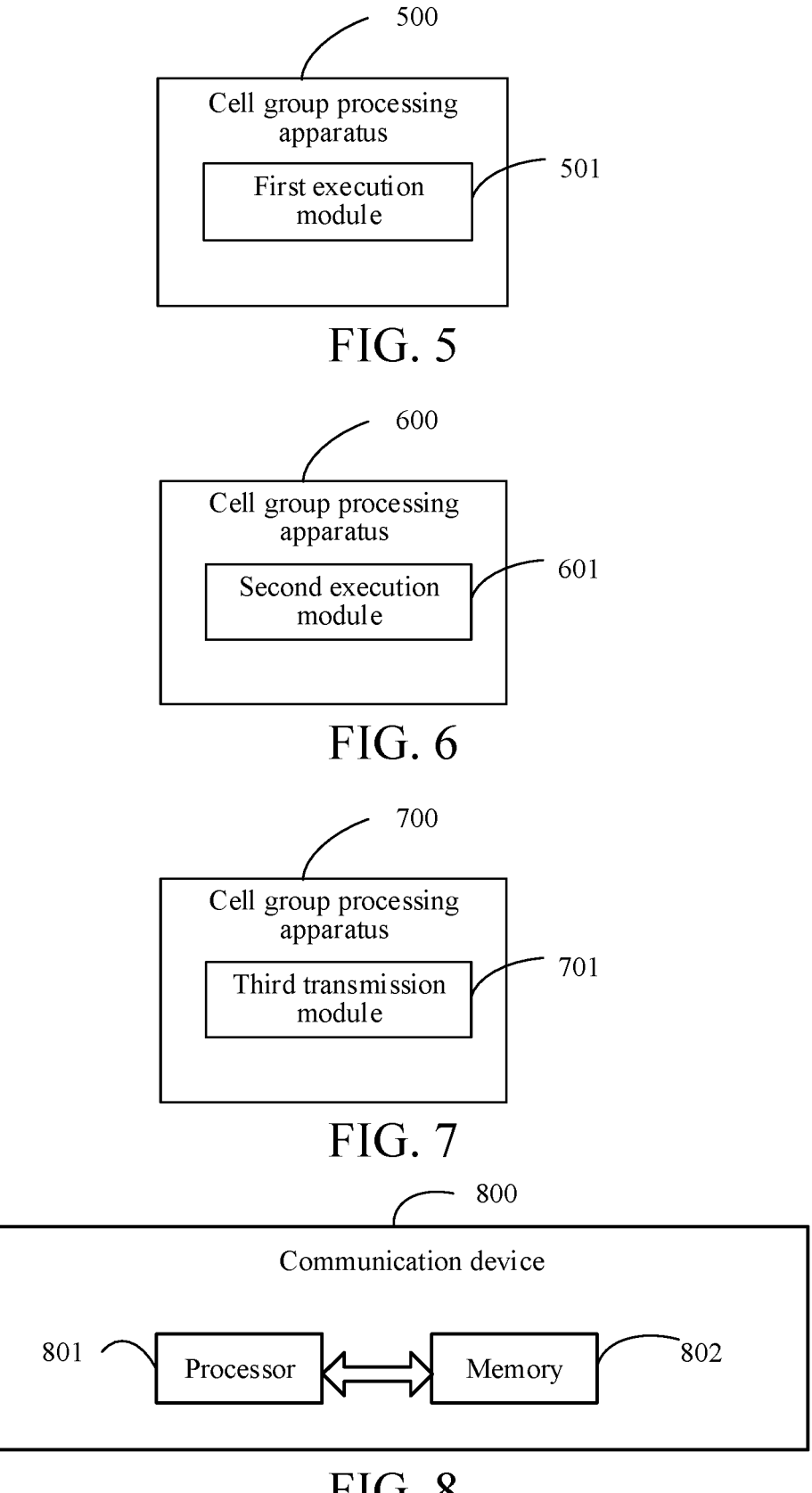
FIG. 5 is a first structural diagram of a cell group processing apparatus according to an embodiment of this application.
FIG. 6 is a second structural diagram of a cell group processing apparatus according to an embodiment of this application.
FIG. 7 is a third flowchart of a cell group processing apparatus according to an embodiment of this application.
FIG. 8 is a first structural diagram of a communication device according to an embodiment of this application.

The technical solutions in the embodiments of this application are clearly described in the following with reference to the accompanying drawings in the embodiments of this application. Apparently, the described embodiments are some rather than all of the embodiments of this application. All other embodiments obtained by a person of ordinary skill in the art based on the embodiments of this application without creative efforts shall fall within the protection scope of this application.

In the specification and claims of this application, the terms "first", "second" and the like are used to distinguish similar objects, but are not used to describe a specific order or sequence. It is to be understood that such used data is interchangeable in a proper circumstance, so that the embodiments of this application may be implemented in an order other than the order illustrated or described herein. The objects distinguished by "first" and "second" are usually of the same kind, and the number of objects is do not defined, for example, there may be one or more first objects. In addition, "and/or" in this specification and the claims represents at least one of the connected objects and "I" generally indicates an "or" relationship between the associated objects.

It should be noted that, the technology described in the embodiments of this application is not limited to be applied to a long term evolution (LTE)/LTE-advanced (LTE-A) system, and may be further applied to other wireless communication systems, such as a code division multiple access (CDMA) system, a time division multiple access (TDMA) system, a frequency division multiple access (FDMA) system, an orthogonal frequency division multiple access (OFDMA) system, a single-carrier frequency-division multiple access (SC-FDMA) system and other systems. The terms "system" and "network" in the embodiments of this application are usually interchangeably used, and the technology described can be used for both the systems and radio technologies mentioned above, as well as for other systems and radio technologies. A new radio (NR) system is described below for an illustrative purpose, and the term NR is used in most of the following descriptions, although these technologies may be applied to applications other than applications of the NR system, such as a $6^{th}$ Generation (6G) communication system.

FIG. 1 is a block diagram of a wireless communication system to which embodiments of this application may be applied. The wireless communication system includes a terminal 11 and a network node 12. For example, the terminal 11 may alternatively be referred to as a terminal device or a user terminal (UE). The terminal 11 may be a terminal-side device such as a mobile phone, a tablet personal computer (Tablet Personal Computer), a laptop computer (Laptop Computer), which is alternatively referred to as a notebook computer, a personal digital assistant (PDA), a handheld computer, a netbook, an ultra-mobile personal computer (UMPC), a mobile Internet device (MID), a wearable device (Wearable Device) or a vehicle mounted device (VUE), or a pedestrian terminal (PUE). The wearable device includes a bracelet, a headphone, glasses, and the like. It should be noted that a specific type of terminal 11 is not defined in the embodiments of this application. The network node 12 may be a base station or a core network. The base station may be referred to as a node B, an evolved node B, an access point, a base transceiver station (BTS), a radio base station, a radio transceiver, a basic service set (BSS), an extended service set (ESS), a B node, an evolved B node (eNB), a household B node, a household evolved B node, a WLAN access point, a Wi-Fi node, a transmitting receiving point (TRP), or some other appropriate term in the art. The base station is not limited to a specific technical term, as long as the same technical effect can be achieved.

For ease of understanding, some contents in the embodiments of this application are described below.

I. Dual Connectivity (DC) and Carrier Aggregation (CA)

The DC provides resources of two network nodes (such as access network elements) for UE. One of the network nodes is referred to as a master node (MN), and the other thereof is referred to as a secondary node (SN). The CA technology is used at each network node, that is, a series of service cells controlled by the node is configured for the UE, which are referred to as a cell group (Cell Group). The MN controls a master cell group (MCG), and the SN controls a secondary cell group (SCG). Each cell group includes a special cell (SpCell) and a series of secondary cells (Scell). The special cell in the MCG is referred to as a primary cell (PCell), and the special cell in the SCG is referred to as a primary secondary cell (PSCell). In a cell group, the SpCell uses a primary carrier, and the other secondary cells use a secondary carrier. Resource scheduling in a cell group is performed by the SpCell.

II. SCG Suspended (Suspended)

The UE may automatically suspend the SCG when determining that the SCG fails, and report SCG failure information to the MN.

Alternatively, the UE may suspend the SCG under control of a network side. For example, when the UE has been in transmission with a low data volume for a long period of time, the network side may temporarily suspend the SCG instead of directly deleting the SCG, and then add the SCG for subsequent transmission with a large data volume. Temporarily suspending the SCG causes the terminal to operate in a more power-saving manner for a long period of time. In addition, the SCG may be recovered quickly when a large volume of data is required to be transmitted.

In the embodiments of this application, the terminal is disconnected from the SCG when the SCG of the terminal is in a suspended state, thereby reducing the power consumption of the terminal. After the SCG of the terminal is recovered, the terminal re-establishes a connection to the SCG, so that data can be transmitted through the SCG to satisfy the data transmission requirement of the terminal. Similarly, the terminal is disconnected from the MCG when the MCG of the terminal is in a suspended state, thereby reducing the power consumption of the terminal. After the MCG of the terminal is recovered, the terminal re-establishes a connection to the MCG, so that data can be transmitted through the MCG to satisfy the data transmission requirement of the terminal.

A cell group processing method provided in the embodiments of this application are described in detail below with reference to the accompanying drawings by using specific embodiments and application scenarios.

FIG. 2 is a first flowchart of a cell group processing method according to an embodiment of this application. The cell group processing method in this embodiment of this application may be applied to a terminal. Further, the terminal may be in an RRC connected state and operate in a dual connectivity (MR-DC) mode, but this application is not limited to thereto.

As shown in FIG. 2, the cell group processing method applied to the terminal may include the following steps:

Step 201: Execute a target process in response to a master cell group (MCG) of the terminal failing in a case that a secondary cell group (SCG) of the terminal is in a suspended state, where the target process is used for requesting to recover at least one of the SCG and the MCG of the terminal.

In this embodiment of this application, the MCG failure of the terminal may be considered as a trigger condition for executing the target process by the terminal.

The target process may be used for any one of: requesting to recover the SCG of the terminal, requesting to recover the MCG of the terminal, or requesting to recover the SCG and the MCG. In actual application, the target process may be configured by a network side or specified by a protocol.

It should be noted that the trigger condition for triggering the SCG of the terminal into the suspended state is not defined in this embodiment of this application. During specific implementation, the terminal may actively trigger the SCG into the suspended state or passively trigger the SCG into the suspended state.

Optionally, the trigger condition may include but is not limited to at least one of:

the SCG of the terminal fails; or an indication message is received, where the indication message is used for indicating that the terminal configures the SCG in the suspended state.

In addition, in this embodiment of this application, the terminal may determine whether the MCG fails by detecting whether communication between the terminal and the network side is normal. Alternatively, the terminal may determine that the MCG fails in a case that a problem regarding the communication between the terminal and the network side is detected.

Optionally, the problem regarding the communication between the terminal and the network side may include but is not limited to any one of:

a radio link between the terminal and the MN fails;

a switchover failure occurs on the terminal;

the terminal finds that an integrity protection failure occurs on signalling transmitted by a signalling radio bearer (SRB) 1 or an SRB2; or the terminal finds that an RRC reconfiguration instruction transmitted by the network side cannot be executed.

Further, the failure of the radio link between the terminal and MN may include any one of: the terminal detects that downlink radio link quality of the network side is lower than a preset threshold; a media access control (MAC) layer of the terminal has made a maximum number of RACH attempts, but fails; or a radio link control (RLC) layer of the terminal has performed a maximum number of acknowledged mode (AM) retransmissions.

Reasons why the terminal finds that the RRC reconfiguration instruction transmitted by the network side cannot be executed may include but is not limited to: a value of a parameter after reconfiguration exceeds a hardware capability of the terminal.

According to the cell group processing method in this embodiment, the target process is executed in response to the master cell group (MCG) of the terminal failing in a case that the secondary cell group (SCG) of the terminal is in the suspended state, where the target process is used for requesting to recover the at least one of the SCG and the MCG of the terminal. It can be learned that the embodiments of this application resolve the problem regarding the cell group recovery if the MCG fails again when the SCG is in the suspended state, which can satisfy the transmission requirement of the terminal for a large data volume.

In this embodiment of this application, the target process may be any process that can be used for requesting to recover the at least one of the SCG and MCG of the terminal, and a specific form of the target process is not defined in this embodiment of this application. Optionally, the target process may be any one of a radio resource control (RRC) reestablishment process or an SCG recovery process.

In this embodiment of this application, optionally, in a case that the target process is the SCG recovery process, the execution of the target process includes:

transmitting an SCG recovery request message to a first network node, where the SCG recovery request message includes at least one of first identification information, second identification information, or third identification information for indicating recovery of the SCG of the terminal; or a cause value for the terminal to perform the target process, where the cause value represents an MCG failure or MCG fast recovery; and the second identification information is obtained by a second network node by truncating the first identification information, and the third identification information is obtained by the terminal by truncating the first identification information.

In this optional implementation, the terminal may be configured to request to recover at least one of the SCG and the MCG of the terminal by transmitting the SCG recovery request message to the first network node.

The SCG recovery request message may include but is not limited to the at least one of the first identification information, the second identification information, or the third identification information for indicating recovery of the SCG of the terminal; or a cause value for the terminal to perform the target process, where the cause value represents the MCG failure or the MCG fast recovery.

The content carried in the SCG recovery request message is described as follows:

1) The first identification information, the second identification information, or the third identification information for indicating recovery of the SCG of the terminal.

The first identification information, the second identification information, and the third identification information all may be used for indicating recovery of the SCG of the terminal. In this way, after acquiring any one of the first identification information, the second identification information, or the third identification information, the first network node can learn that the SCG recovery request message is used for requesting to recover the at least one of the SCG and the MCG of the terminal.

In this optional implementation, the second identification information is obtained by the second network node by truncating the first identification information, and the third identification information is obtained by the terminal by truncating the first identification information. That is to say, the second identification information and the third identification information both may be obtained by truncating the first identification information, but the second identification information is generated by the second network node and the third identification information is generated by the terminal. The second identification information and the third identification information may be considered as identification information of the first identification information in a truncated format.

During specific implementation, the first identification information and the second identification information may be configured for the second network node, and the third identification information may be generated by the terminal.

In a first implementation, the second network node may be configured with only the first identification information.

In a second implementation, the second network node may be configured with both the first identification information and the second identification information.

For example, in a long term evolution (Long Term Evolution, LTE) system, the second network node may be configured with only the first identification information. In an NR system, the second network node may be configured with both the first identification information and the second identification information.

In the above first implementation, the terminal may generate the third identification information. In the above second implementation, since the second network node is configured with the second identification information, the terminal may generate the third identification information.

In this optional implementation, if the SCG recovery request message includes the first identification information, the second identification information, or the third identification information for indicating recovery of the SCG of the terminal, the terminal may determine, in the following manner, the identification information to be carried in the SCG recovery request message:

detecting whether a number of bits that can be carried in the SCG recovery request message is greater than a second threshold;

determining to carry the first identification information in the SCG recovery request message in a case that the number of bits that can be carried in the SCG recovery request message is greater than the second threshold; and determining to carry the second identification information or the third identification information in the SCG recovery request message in a case that the number of bits that can be carried in the SCG recovery request message is less than or equal to the second threshold.

Further, it is detected whether the second network node is configured with the second identification information in a case that the number of bits that can be carried in the SCG recovery request message is less than or equal to the second threshold. If the second network node is configured with the second identification information, it is determined to carry the second identification information in the SCG recovery request message. Otherwise, the terminal generates the third identification information, and it is determined to carry the third identification information in the SCG recovery request message.

2) The cause value for the terminal to execute the target process, where the cause value represents the MCG failure or the MCG fast recovery.

It can be learned from the above that in this embodiment of this application, the target process is triggered by the failure of the MCG of the terminal. Therefore, in a case that the SCG recovery request message includes the cause value for the terminal to execute the target process, the cause value may be directly indicated as the MCG failure (MCG failure) or the MCG fast recovery (MCG fast recovery). In this way, after acquiring the cause value, the first network node can learn that the SCG recovery request message is used for requesting to recover the at least one of the SCG and the MCG of the terminal.

In this optional implementation, the SCG recovery process may be implemented by a RACH process or a scheduling request (SR) process, but this application is not limited thereto. Further, the RACH process can be a 4-step RACH process or a 2-step RACH process.

If the SCG recovery process is recovered through the RACH process, the SCG recovery request message may be carried in a message (Msg) 3 of the 4-step RACH process in the 4-step RACH process, and the SCG recovery request message may be carried in an MsgA of the 2-step RACH process in the 2-step RACH process. If the SCG recovery process is recovered through the SR process, the SCG recovery request message may be carried in an SR request message of the SR process.

It can be seen that in the above manner, the terminal can request to recover the at least one of the SCG and the MCG of the terminal by transmitting the SCG recovery request message to the first network node, which specifies the process of recovering the at least one of the SCG and the MCG of the terminal.

In this embodiment of this application, optionally, after the transmitting an SCG recovery request message to a first network node, the method further includes:

receiving a response message for the SCG recovery request message transmitted by the first network node, where the response message carries at least one of SCG configuration information or MCG configuration information.

During specific implementation, the first network node may transmit the response message for the SCG recovery request message to the terminal after receiving the SCG recovery request message from the terminal, to indicate whether the terminal is allowed to recover the at least one of the SCG and the MCG.

If the SCG recovery process is recovered through the RACH process, the response message may be carried in an Msg4 of the 4-step RACH process in the 4-step RACH process, and the response message may be carried in an MsgB of the 2-step RACH process in the 2-step RACH process. If the SCG recovery process is recovered through the SR process, the response message may be carried in an SR response request message of the SR process.

In actual application, the response message transmitted by the first network node may indicate that the terminal is allowed to recover the at least one of the SCG and the MCG, or may indicate that the terminal is not allowed to recover the at least one of the SCG and the MCG. In addition, in a case that the SCG recovery request is used for requesting to recover the SCG and the MCG of the terminal, the response message may indicate that the terminal is allowed to recover only the SCG or the MCG.

In this optional implementation, the response message carries at least one of the SCG configuration information and the MCG configuration information, indicating that the response message transmitted by the first network node may indicate that the terminal is allowed to recover the at least one of the SCG and the MCG. It should be understood that, if the first network node does not allow the terminal to recover the cell group the terminal requested to recover, the response message may not include the SCG configuration information or the MCG configuration information.

During specific implementation, the SCG configuration information includes at least a PSCell configuration. Further, the SCG configuration information may further include at least one SCell configuration. The MCG configuration information includes at least a PCell configuration and. Further, the MCG configuration information may further include at least one SCell configuration.

It should be noted that the PSCell configuration included in the SCG configuration information may be the same as or different from a PSCell configuration of the SCG suspended by the terminal. The SCell configuration included in the SCG configuration information may be the same as or different from an SCell configuration of the SCG suspended by the terminal. The PCell configuration included in the MCG configuration information may be the same as or different from a PCell configuration of the MCG suspended by the terminal. The SCell configuration included in the MCG configuration information may be the same as or different from an SCell configuration of the MCG suspended by the terminal.

The PSCell configuration included in the SCG configuration information is used as an example below for description.

Further, in a case that the PSCell configuration included in the SCG configuration information is different from the PSCell configuration of the SCG suspended by the terminal, the PSCell configuration included in the SCG configuration information may be a complete PSCell configuration. In this case, the terminal may directly recover the SCG according to the PSCell configuration included in the SCG configuration information. Alternatively, the PSCell configuration included in the SCG configuration information may be a varying value of the PSCell configuration. In this case, the terminal needs to recover the SCG according to the PSCell configuration included in the SCG configuration information and the PSCell configuration of the SCG suspended by the terminal.

It should be understood that the implementation principles of the above example are applicable to the SCell configuration in the SCG configuration information and the PCell configuration and the SCell configuration in the MCG configuration information. In order to avoid repetition, details are not described herein.

In this embodiment of this application, optionally, after the receiving SCG recovery configuration information transmitted by the first network node, the method further includes:

transmitting a target message, where the target message is any one of:

the target message is a first SCG recovery completion message in a case that the response message includes the MCG configuration information and the SCG configuration information, where the first SCG recovery completion message is used for indicating a success of SCG recovery of the terminal, and is further used for indicating a success or a failure of MCG recovery of the terminal;

the target message is a second SCG recovery completion message in a case that the response message includes the SCG configuration information, where the second SCG recovery completion message is used for indicating a success of the SCG recovery of the terminal, and is further used for indicating a failure of the MCG recovery of the terminal; or the target message is an SCG recovery failure message in a case that the response message includes the MCG configuration information, where the SCG recovery failure message is used for indicating a failure of the SCG recovery of the terminal, and is further used for indicating a success or a failure of the MCG recovery.

This optional implementation is applicable to the target process being used for requesting to recover the SCG and the MCG of the terminal, but this application is not limited thereto.

The target message is detailed as follows:

Case I: The response message includes the MCG configuration information and the SCG configuration information.

In Case I, since the response message includes the MCG configuration message, the MCG recovery of the terminal may succeed or fail, and the terminal may indicate a success or a failure of the MCG recovery of the terminal through the first SCG recovery completion message.

During specific implementation, the first SCG recovery completion message may include the following implementations:

Implementation 1: The first SCG recovery completion message is used for indicating a success of the SCG recovery and the MCG recovery of the terminal.

Implementation 2: The first SCG recovery completion message is used for indicating a success of the SCG recovery of the terminal, and is further used for indicating a success or a failure of the MCG recovery of the terminal.

For implementation 1, the success of the MCG recovery of the terminal may be indicated implicitly or explicitly through the first SCG recovery completion message. Detailed description is as follows:

In a case that the success of the MCG recovery of the terminal is indicated explicitly through the first SCG recovery completion message, the first SCG recovery completion message may include a first indicator field used for indicating the success of the MCG recovery of the terminal. In this way, the network side may determine that the MCG recovery of the terminal succeeds after acquiring the first indicator field.

In a case that the success of the MCG recovery of the terminal is indicated implicitly through the first SCG recovery completion message, a receipt of the first SCG recovery completion message by the network side is considered as the success of the MCG recovery of the terminal. Thus, the first indicator field does not need to be carried, which reduces the signaling overheads.

For implementation 2, the success or failure of the MCG recovery of the terminal may be indicated explicitly through the first SCG recovery completion message. Detailed description is as follows:

The first SCG recovery completion message may include a second indicator field used for indicating the success or failure of the MCG recovery of the terminal. Alternatively, the second indicator field is used for indicating the success of the MCG recovery of the terminal in a case that a value of the second indicator field is a first value, and the second indicator field is used for indicating the failure of the MCG recovery of the terminal in a case that the value of the second indicator field is a second value. In this way, the network side may determine whether the MCG recovery of the terminal succeeds or fails according to the acquired value of the second indicator field.

Case II: The response message includes the SCG configuration information.

In Case II, since the response message does not include the MCG configuration information, indicating that the first network node rejects the recovery of the MCG of the terminal, the terminal may indicate a failure of the MCG recovery of the terminal through the second SCG recovery completion message.

During specific implementation, the failure of the MCG recovery of the terminal may be explicitly indicated through the second SCG recovery completion message. For example, the second SCG recovery completion message may include a third indicator field used for indicating the failure of the MCG recovery of the terminal. In this way, the network side may determine that the MCG recovery of the terminal fails after obtaining the third indicator field.

Case III: The response message includes the MCG configuration information.

In Case III, since the response message includes the MCG configuration message, the MCG recovery of the terminal may succeed or fail, and the terminal may indicate a success or a failure of the MCG recovery of the terminal through the SCG recovery failure message.

During specific implementation, the SCG recovery failure message may include the following implementations:

Implementation 1: The SCG recovery failure message is used for indicating the failure of the SCG recovery and the MCG recovery of the terminal.

Implementation 2: The SCG recovery failure message is used for indicating the failure of the SCG recovery of the terminal, and is further used for indicating the success or the failure of the MCG recovery of the terminal.

For implementation 1, the success of the MCG recovery of the terminal may be indicated implicitly or explicitly through the SCG recovery failure message. Detailed description is as follows:

In a case that the failure of the MCG recovery of the terminal is indicated explicitly through the SCG recovery failure message, the SCG recovery failure message may include a fourth indicator field used for indicating the failure of the MCG recovery of the terminal. In this way, the network side may determine that the MCG recovery of the terminal fails after acquiring the fourth indicator field.

In a case that the success of the MCG recovery of the terminal is indicated implicitly through the SCG recovery failure message, a receipt of the SCG recovery failure message by the network side is considered as the failure of the MCG recovery of the terminal. Thus, the fourth indicator field does not need to be carried, which reduces the signaling overheads.

For implementation 2, the success or failure of the MCG recovery of the terminal may be indicated explicitly through the SCG recovery failure message. Detailed description is as follows:

The SCG recovery failure message may include a fifth indicator field used for indicating the success or the failure of MCG recovery of the terminal. Alternatively, the fifth indicator field is used for indicating the success of the MCG recovery of the terminal in a case that a value of the second indicator field is a first value, and the fifth indicator field is used for indicating the failure of the MCG recovery of the terminal in a case that the value of the second indicator field is a second value. In this way, the network side may determine whether the MCG recovery of the terminal succeeds or fails according to the acquired value of the fifth indicator field.

In this embodiment of this application, the terminal may transmit the target message to at least one of the first network node and an MN corresponding to the terminal. For ease of understanding, detailed description is as follows:

Optionally, the transmitting a target message includes: transmitting the target message to the first network node.

Optionally, the transmitting a target message includes any one of:

1) transmitting, through the first network node, the target message to a master node (MN) corresponding to the terminal; or 2) directly transmitting the target message to the MN corresponding to the terminal.

In scenario 1), after receiving the SCG recovery completion message transmitted by the terminal, the first network node may forward the received SCG recovery completion message to the MN corresponding to the terminal through an interface such as Xn, and the terminal does not need to communicate with the corresponding MN. In scenario 2), the terminal may directly transmit the target message to the corresponding MN, and the first network node does not need to communicate with the MN corresponding to the terminal.

It should be noted that the second network node and the first network node in this embodiment of this application may be a same network node or different network nodes. This is determined according to an actual situation, and is not limited in this embodiment of this application.

The second network node may be an MN corresponding to the terminal or an SN corresponding to the terminal before the terminal suspends the SCG. The first network node may be the SN corresponding to the terminal before the terminal suspends the SCG or a network node of a cell group in a cell list indicated by the second network node.

Optionally, the first network node may be a network node of any one of:

any cell group in a first cell list;

a first cell group in the first cell list, where a primary secondary cell (PSCell) included in the first cell group satisfies a cell quality threshold;

a second cell group in the first cell list, where a PSCell included in the second cell group is a PSCell having the best cell quality from candidate PSCells included in the first cell list; or a third cell group corresponding to a secondary node (SN) before the SCG of the terminal is suspended, where each of the cell groups includes at least a PSCell.

The first cell list may include at least one PSCell identifier. Each PSCell identifier corresponds to at least one Scell identifier. The each cell group may include one PSCell and one or more Scell identifiers corresponding to the PSCell.

In a case that at least two PSCells in the first cell list satisfy the cell quality threshold, the first cell group may be any cell group including any one of the at least two PSCells.

For ease of understanding, an example is illustrated as follows:

It is assumed that the first cell list includes a PSCell identifier a (identifying a PSCell1), a PSCell identifier b (identifying a PSCell2), and a PSCell identifier c (identifying a PSCell3). The PSCell1 and the PSCell2 satisfy the cell quality threshold. Cell quality of the PSCell2 is better than those of the PSCell1 and the PSCell3. The PSCell3 is a PSCell corresponding to the SN before the terminal suspends the SCG.

Therefore, in a case that the first network node is a network node of any cell group in the first cell list, the first network node may be a network node of any cell group including the PSCell1, the PSCell2, or the PSCell3.

In a case that the first network node is a network node of the first cell group, the first network node may be a network node of any cell group including the PSCell1 or the PSCell.

In a case that the first network node is a network node of the second cell group, the first network node may be a network node of any cell group including the PSCell2.

In a case that the first network node is a network node of the third cell group, the first network node may be a network node of any cell group including the PSCell3.

It should be noted that the first cell list and the cell quality threshold can be configured by the second network node, but this application is not limited thereto. The cell quality threshold may be determined through any one of the following parameters (but the parameters are not limited to the following): a reference signal received power (Reference Signal Received Power, RSRP), reference signal received quality (Reference Signal Received Quality, RSRQ), or a signal-to-noise and interference ratio (Signal-to-Noise and Interference Ratio, SINR).

In this embodiment of this application, optionally, when the secondary cell group (SCG) of the terminal is in the suspended state, before the SCG of the terminal is recovered by using the target resource, the method further includes:

receiving SCG suspension configuration information transmitted by a second network node.

Further, the SCG suspension configuration information includes at least one of:

first identification information for indicating recovery of the SCG of the terminal;

second identification information for indicating recovery of the SCG of the terminal, where the second identification information is obtained by truncating the first identification information;

a first cell list for indicating recovery of the SCG of the terminal; or a cell quality threshold for indicating recovery of the SCG of the terminal.

It should be noted that for description of the first identification information, the second identification information, the first cell list, and the cell quality threshold, refer to the above description, which is not repeated herein.

Further, the first identification information includes at least one of:

a cell-radio network temporary identifier (C-RNTI) used by the terminal in the master cell group (MCG);

a C-RNTI used by the terminal in the SCG; or a resume ID (resume ID) of context information of the SCG of the terminal.

The second identification information may be a truncated resume ID (truncated resume ID) of the context information of the SCG of the terminal. Similarly, the above third identification information may be considered as the truncated resume ID of the context information of the SCG of the terminal.

In this embodiment of this application, the SCG suspension configuration information may be used for at least one of:

indicating configuration of the SCG of the terminal in the suspended state; or indicating recovery of relevant information of the SCG by the terminal.

In a case that the SCG suspension configuration information is used for indicating configuration of the SCG of the terminal in the suspended state, the terminal may configure the SCG in the suspended state in a case that the terminal receives the SCG suspension configuration information. In this way, fast suspension of the SCG of the terminal can be realized, which can reduce the power consumption of the terminal.

In a case that the SCG suspension configuration information is used for indicating recovery of relevant information of the SCG by the terminal, the trigger condition that triggers the SCG of the terminal into the suspended state is not receipt of the SCG suspension configuration information by the terminal, but the terminal may recover the at least one of the SCG and the MCG of the terminal according to the configuration content of the SCG suspension configuration information. In this way, fast recovery of the cell group can be realized, which can satisfy the transmission requirement of the terminal for a large data volume.

In a case that the SCG suspension configuration information is used not only for indicating configuration of the SCG of the terminal in the suspended state but also for indicating recovery of relevant information of the SCG by the terminal, the terminal may configure the SCG in the suspended state after receiving the SCG suspension configuration information. That is to say, the trigger condition that triggers the SCG of the terminal into the suspended state is the receipt of the SCG suspension configuration information by the terminal. Further, the SCG suspension configuration information may be stored, and then the at least one of the SCG and the MCG of the terminal may be recovered according to the configuration content of the SCG suspension configuration information. In this way, not only fast suspension of the SCG of the terminal can be realized, which can reduce the power consumption of the terminal, but also fast recovery of the cell group can be realized, which can satisfy the transmission requirement of the terminal for a large data volume.

It should be noted that the embodiments of this application may further protect an SCG processing method, which is applied to a terminal and may include:

configuring an SCG of the terminal in a suspended state in a case that SCG suspension configuration information is received.

Optionally, after the configuring an SCG of the terminal in a suspended state, the method may further include:

executing a target process in response to a master cell group (MCG) of the terminal failing, where the target process is used for requesting to recover at least one of the SCG and an MCG of the terminal.

A main difference between the SCG processing method and the SCG processing method in the method embodiment in FIG. 2 are is that the SCG processing method focuses on how the terminal suspends the SCG while the processing method in the method embodiment in FIG. 2 focuses on how the terminal triggers the target process.

FIG. 3 is a second flowchart of a cell group processing method according to an embodiment of this application. The cell group processing method in this embodiment of this application is applied to a first network node.

As shown in FIG. 3, the cell group processing method applied to the first network node may include the following steps:

Step 301: Execute a target process in response to a master cell group (MCG) of a terminal failing in a case that a secondary cell group (SCG) of the terminal is in a suspended state, where the target process is used for recovering at least one of the SCG and the MCG of the terminal.

In the cell group processing method in this embodiment, when the secondary cell group (SCG) of the terminal is in the suspended state, the SCG of the terminal is recovered by using a target resource. It can be learned that the embodiments of this application resolve the problem regarding the cell group recovery if the MCG fails again when the SCG is in the suspended state, which can satisfy the transmission requirement of the terminal for a large data volume.

Optionally, the target process is any one of a radio resource control (RRC) reestablishment process or an SCG recovery process.

Optionally, in a case that the target process is the SCG recovery process, the executing a target process includes:

receiving an SCG recovery request message transmitted by the terminal, where the SCG recovery request message includes at least one of first identification information, second identification information, or third identification information for indicating recovery of the SCG of the terminal; or a cause value for the terminal to perform the target process, where the cause value represents an MCG failure or MCG fast recovery; and the second identification information is obtained by a second network node by truncating the first identification information, and the third identification information is obtained by the terminal by truncating the first identification information.

Optionally, after the receiving an SCG recovery request message transmitted by the terminal, the method further includes:

transmitting a response message for the SCG recovery request message to the terminal, where the response message carries at least one of SCG configuration information or MCG configuration information.

Optionally, after the transmitting a response message for the SCG recovery request message to the terminal, the method further includes:

receiving a target message transmitted by the terminal, where the target message is any one of:

the target message is a first SCG recovery completion message in a case that the response message includes the MCG configuration information and the SCG configuration information, where the first SCG recovery completion message is used for indicating a success of SCG recovery of the terminal, and is further used for indicating a success or a failure of MCG recovery of the terminal;

the target message is a second SCG recovery completion message in a case that the response message includes the SCG configuration information, where the second SCG recovery completion message is used for indicating a success of the SCG recovery of the terminal, and is further used for indicating a failure of the MCG recovery of the terminal; or the target message is an SCG recovery failure message in a case that the response message includes the MCG configuration information, where the SCG recovery failure message is used for indicating a failure of the SCG recovery of the terminal, and is further used for indicating a success or a failure of the MCG recovery.

Optionally, after the receiving a target message transmitted by the terminal, the method further includes:

transmitting the target message to a master node (MN) corresponding to the terminal.

Optionally, the receiving a target message transmitted by the terminal includes any one of:

receiving an SCG recovery completion message transmitted by the terminal in a case that the response message includes the MCG configuration information and the SCG configuration information; or receiving an SCG recovery completion message transmitted by the terminal in a case that the response message includes at least the SCG configuration information, where the SCG recovery completion message is further used for indicating a success or a failure of the MCG recovery.

Optionally, the first network node is a network node of any one of:

any cell group in a first cell list;

a first cell group in the first cell list, where a primary secondary cell (PSCell) included in the first cell group satisfies a cell quality threshold;

a second cell group in the first cell list, where a PSCell included in the second cell group is a PSCell having the best cell quality from candidate PSCells included in the first cell list; or a third cell group corresponding to a secondary node (SN) before the SCG of the terminal is suspended, where each of the cell groups includes at least a PSCell.

It should be noted that this embodiment is used as the implementation of the first network node corresponding to the method embodiment of FIG. 2. Therefore, for this implementation, refer to the relevant description in the above method embodiment. In addition, the same beneficial effect can be achieved. In order to avoid repeated description, details are not described herein.

FIG. 4 is a third flowchart of a cell group processing method according to an embodiment of this application. The cell group processing method in this embodiment of this application is applied to a second network node.

As shown in FIG. 4, the cell group processing method applied to the second network node may include the following steps:

Step 401: Transmit SCG suspension configuration information to a terminal.

In this embodiment of this application, the SCG suspension configuration information may be used for at least one of:

indicating configuration of the SCG of the terminal in the suspended state; or indicating recovery of relevant information of the SCG by the terminal.

For a function of the SCG suspension configuration information, refer to the description in the method embodiment of FIG. 2, and the details are not described herein.

According to the cell group processing method in this embodiment, the SCG suspension configuration information is transmitted to the terminal, so that at least one of the following can be realized: fast suspension of the SCG of the terminal, which can reduce the power consumption of the terminal, or fast recovery of the SCG of the terminal, which can satisfy the transmission requirement of the terminal for a large data volume.

Optionally, the SCG suspension configuration information includes at least one of:

first identification information for indicating recovery of the SCG of the terminal;

second identification information for indicating recovery of the SCG of the terminal, where the second identification information is obtained by truncating the first identification information;

a first cell list for indicating recovery of the SCG of the terminal; or a cell quality threshold for indicating recovery of the SCG of the terminal.

Optionally, the first identification information includes at least one of:

a cell-radio network temporary identifier (C-RNTI) used by the terminal in the master cell group (MCG);

a C-RNTI used by the terminal in the SCG; or a resume ID of context information of the SCG of the terminal.

It should be noted that this embodiment is used as the implementation of the second network node corresponding to the method embodiment of FIG. 2. Therefore, for this implementation, refer to the relevant description in the above method embodiment. In addition, the same beneficial effect can be achieved. In order to avoid repeated description, details are not described herein.

It should be noted that the plurality of optional implementations described in the embodiments of this application may be implemented in combination with each other or implemented separately, which is not limited in the embodiments of this application.

For the convenience of understanding, examples are as follows:

The cell group processing method in this example may include the following steps:

Step I: UE is in an RRC connected state and operates in an MR-DC mode.

Step II: An MN or an SN transmits an RRC message to the UE to configure an SCG of the UE in a suspended state. Details are as follows:

The RRC message carries SCG suspension configuration. Configuration content of the SCG suspension configuration includes at least one of:

identification information for recovering the SCG, such as
a C-RNTI used by the UE in an MCG and/or the SCG,
a resume ID for distinguishing a context of the SCG of
the UE, or a truncated resume ID for distinguishing the
context of the SCG of the UE a cell list for recovering the SCG, including at least one
PSCell identifier, where each PSCell may have one or
more SCell identifiers; or a cell quality threshold (RSRP, RSRQ, and SINR) for
recovering the SCG.

Step III: The UE stores a received SCG suspension
configuration.

Step IV: The UE determines whether an MCG fails, and
performs step V or step VI if a condition for an MCG
failure is satisfied.

Step V: Trigger an RRC reestablishment process.

Step VI: Trigger an SCG recovery process. Details are as
follows:

The UE transmits an SCG recovery request message to a
network node. The SCG recovery request message carries
the following:

identification information for recovering the SCG, where
the identification information for recovering the SCG is
the configuration of step II or the truncated identifica-
tion information generated by the UE according to the
configuration of step II; and a cause for initiating the SCG recovery request, where a
new cause value is defined as an MCG failure or MCG
fast recovery.

Due to mobility of the UE, the network node herein and
the SN in step II may be a same node or different nodes.
Specifically, the network node may be:

a group (a PSCell or an SCell) of the SCG suspension
configuration in step II;

a group (a PSCell or an SCell) of the SCG suspension
configuration in step II satisfying the cell quality
threshold;

a group (a PSCell or an SCell) of the SCG suspension
configuration in step II having the best cell quality; and (a PSCell or an SCell) corresponding to the SN in step II.

The network node feeds back an SCG recovery configu-
ration message to the UE, where the SCG recovery configu-
ration message carries MCG configuration and SCG con-
figuration.

The UE transmits an SCG recovery completion message
to the network node.

After the UE recovers the SCG, the network node notifies
the MN of "SCG recovery success" through an Xn interface,
or the UE directly notifies the MN of "SCG recovery
success".

The UE directly notifies the MN of "MCG recovery
success".

In this example, since the MCG fails (failure) when the
SCG is suspended (suspend), the UE determines to perform
reestablishment, or triggers the SCG and the MCG fast
recovery process. It can be learned that this example can
quickly recover the MCG and the SCG simultaneously when
the terminal SCG is suspended and the MCG fails, which
reduces the signaling delay.

This example may be applied to an MR-DC scenario.

It should be noted that the cell group processing method
provided in this embodiment of this application may be
performed by a cell group processing apparatus or by a
control module in the cell group processing apparatus con-
figured to perform the cell group processing method.

The cell group processing apparatus in this embodiment
of this application may be an apparatus or a component, an integrated circuit, or a chip in a communication device. The
communication device may be a terminal, a first network
node, or a second network node. The cell group processing
apparatus in this embodiment of this application may be an
apparatus having an operating system. The operating system
may be Android (Android), IOS, or other possible operating
systems, which is not specifically defined in this embodi-
ment of this application.

FIG. 5 is a structural diagram of a cell group processing
apparatus according to an embodiment of this application.
The cell group processing apparatus 500 shown in FIG. 5
may be applied to a terminal.

As shown in FIG. 5, the cell group processing apparatus
500 includes:

a first execution module 501, configured to execute a
target process in response to a master cell group (MCG)
of the terminal failing in a case that a secondary cell
group (SCG) of the terminal is in a suspended state,
where the target process is used for requesting to
recover at least one of the SCG and the MCG of the
terminal.

Optionally, the target process is any one of a radio
resource control (RRC) reestablishment process or an SCG
recovery process.

Optionally, in a case that the target process is the SCG
recovery process, the first execution module 501 includes:

a first transmission unit, configured to transmit an SCG
recovery request message to a first network node,
where the SCG recovery request message includes at
least one of first identification information, second
identification information, or third identification infor-
mation for indicating recovery of the SCG of the
terminal; or a cause value for the terminal to perform
the target process, where the cause value represents an
MCG failure or MCG fast recovery; and the second identification information is obtained by a
second network node by truncating the first identifica-
tion information, and the third identification informa-
tion is obtained by the terminal by truncating the first
identification information.

Optionally, the first execution module 501 further
includes:

a first receiving unit, configured to receive a response
message for the SCG recovery request message trans-
mitted by the first network node, where the response message carries at least one of SCG con-
figuration information or MCG configuration informa-
tion.

Optionally, the cell group processing apparatus 500 fur-
ther includes:

a first transmission module, configured to:

transmit a target message, where the target message is any
one of:

the target message is a first SCG recovery completion
message in a case that the response message includes
the MCG configuration information and the SCG con-
figuration information, where the first SCG recovery
completion message is used for indicating a success of
SCG recovery of the terminal, and is further used for
indicating a success or a failure of MCG recovery of the
terminal;

the target message is a second SCG recovery completion
message in a case that the response message includes
the SCG configuration information, where the second
SCG recovery completion message is used for indicat-
ing a success of the SCG recovery of the terminal, and
is further used for indicating a failure of the MCG recovery of the terminal; or the target message is an SCG recovery failure message in a case that the response message includes the MCG configuration information, where the SCG recovery failure message is used for indicating a failure of the SCG recovery of the terminal, and is further used for indicating a success or a failure of the MCG recovery.

Optionally, the first transmission module is configured to: transmit the target message to the first network node.

Optionally, the first transmission module is configured to perform any one of:

transmitting, through the first network node, the target message to a master node (MN) corresponding to the terminal; or directly transmitting the target message to the MN corresponding to the terminal.

Optionally, the first network node is a network node of any one of:

any cell group in a first cell list;

a first cell group in the first cell list, where a primary secondary cell (PSCell) included in the first cell group satisfies a cell quality threshold;

a second cell group in the first cell list, where a PSCell included in the second cell group is a PSCell having the best cell quality from candidate PSCells included in the first cell list; or a third cell group corresponding to a secondary node (SN) before the SCG of the terminal is suspended, where each of the cell groups includes at least a PSCell.

Optionally, before the execution of the target process in response to the master cell group (MCG) of the terminal failing in a case that the secondary cell group (SCG) of the terminal is in the suspended state, the cell group processing apparatus 500 further includes:

a receiving module, configured to receive SCG suspension configuration information transmitted by a second network node.

Optionally, the SCG suspension configuration information includes at least one of:

first identification information for indicating recovery of the SCG of the terminal;

second identification information for indicating recovery of the SCG of the terminal, where the second identification information is obtained by truncating the first identification information;

a first cell list for indicating recovery of the SCG of the terminal; or a cell quality threshold for indicating recovery of the SCG of the terminal.

Optionally, the first identification information includes at least one of:

a cell-radio network temporary identifier (C-RNTI) used by the terminal in the master cell group (MCG);

a C-RNTI used by the terminal in the SCG; or a resume ID of context information of the SCG of the terminal.

The cell group processing apparatus 500 provided in this embodiment of this application can realize all processes realized in the method embodiment of FIG. 2 and achieve the same technical effects. In order to avoid repetition, details are not described herein.

FIG. 6 is a structural diagram of a cell group processing apparatus according to an embodiment of this application. The cell group processing apparatus 600 shown in FIG. 6 may be applied to a terminal.

As shown in FIG. 6, the cell group processing apparatus 600 includes:

a second execution module 601, configured to execute a target process in response to a master cell group (MCG) of a terminal failing in a case that a secondary cell group (SCG) of the terminal is in a suspended state, where the target process is used for recovering at least one of the SCG and the MCG of the terminal.

Optionally, the target process is any one of a radio resource control (RRC) reestablishment process or an SCG recovery process.

Optionally, in a case that the target process is the SCG recovery process, the second execution module 601 includes:

a second receiving unit, configured to receive an SCG recovery request message transmitted by the terminal, where the SCG recovery request message includes at least one of first identification information, second identification information, or third identification information for indicating recovery of the SCG of the terminal; or a cause value for the terminal to perform the target process, where the cause value represents an MCG failure or MCG fast recovery; and the second identification information is obtained by a second network node by truncating the first identification information, and the third identification information is obtained by the terminal by truncating the first identification information.

Optionally, the second execution module 601 further includes:

a second transmission unit, configured to transmit a response message for the SCG recovery request message to the terminal, where the response message carries at least one of SCG configuration information or MCG configuration information.

Optionally, the cell group processing apparatus 600 further includes:

a second receiving module, configured to receive a target message transmitted by the terminal, where the target message is any one of:

the target message is a first SCG recovery completion message in a case that the response message includes the MCG configuration information and the SCG configuration information, where the first SCG recovery completion message is used for indicating a success of SCG recovery of the terminal, and is further used for indicating a success or a failure of MCG recovery of the terminal;

the target message is a second SCG recovery completion message in a case that the response message includes the SCG configuration information, where the second SCG recovery completion message is used for indicating a success of the SCG recovery of the terminal, and is further used for indicating a failure of the MCG recovery of the terminal; or the target message is an SCG recovery failure message in a case that the response message includes the MCG configuration information, where the SCG recovery failure message is used for indicating a failure of the SCG recovery of the terminal, and is further used for indicating a success or a failure of the MCG recovery.

Optionally, the cell group processing apparatus 600 further includes:

a second transmission module, configured to transmit the target message to a master node (MN) corresponding to the terminal.

Optionally, the first receiving module is configured to perform any one of:

receiving an SCG recovery completion message transmitted by the terminal in a case that the response message includes the MCG configuration information and the SCG configuration information; or receiving an SCG recovery completion message transmitted by the terminal in a case that the response message includes at least the SCG configuration information, where the SCG recovery completion message is further used for indicating a success or a failure of the MCG recovery.

Optionally, the first network node is a network node of any one of:

any cell group in a first cell list;

a first cell group in the first cell list, where a primary secondary cell (PSCell) included in the first cell group satisfies a cell quality threshold;

a second cell group in the first cell list, where a PSCell included in the second cell group is a PSCell having the best cell quality from candidate PSCells included in the first cell list; or a third cell group corresponding to a secondary node (SN) before the SCG of the terminal is suspended, where each of the cell groups includes at least a PSCell.

The cell group processing apparatus 600 provided in this embodiment of this application can realize all processes realized in the method embodiment of FIG. 3 and achieve the same technical effects. In order to avoid repetition, details are not described herein.

FIG. 7 is a structural diagram of a cell group processing apparatus according to an embodiment of this application. The cell group processing apparatus 700 shown in FIG. 7 may be applied to a terminal.

As shown in FIG. 7, the cell group processing apparatus 700 includes:

a third transmission module 701, configured to transmit SCG suspension configuration information to a terminal.

Optionally, the SCG suspension configuration information includes at least one of:

first identification information for indicating recovery of the SCG of the terminal;

second identification information for indicating recovery of the SCG of the terminal, where the second identification information is obtained by truncating the first identification information;

a first cell list for indicating recovery of the SCG of the terminal; or a cell quality threshold for indicating recovery of the SCG of the terminal.

Optionally, the first identification information includes at least one of:

a cell-radio network temporary identifier (C-RNTI) used by the terminal in the master cell group (MCG);

a C-RNTI used by the terminal in the SCG; or a resume ID of context information of the SCG of the terminal.

The cell group processing apparatus 700 provided in this embodiment of this application can realize all processes realized in the method embodiment of FIG. 4 and achieve the same technical effects. In order to avoid repetition, details are not described herein.

Optionally, as shown in FIG. 8, an embodiment of this application further provides a communication device 800, including a processor 801, a memory 802, programs or instructions stored on memory 802 and executable on the processor 801. The programs or the instructions, when executed by the processor 801, implement the processes of the method embodiment of FIG. 2, the method embodiment of FIG. 3, or the method embodiment of FIG. 4, and can achieve the same technical effects. In order to avoid repetition, details are not described herein.

Figure 9:
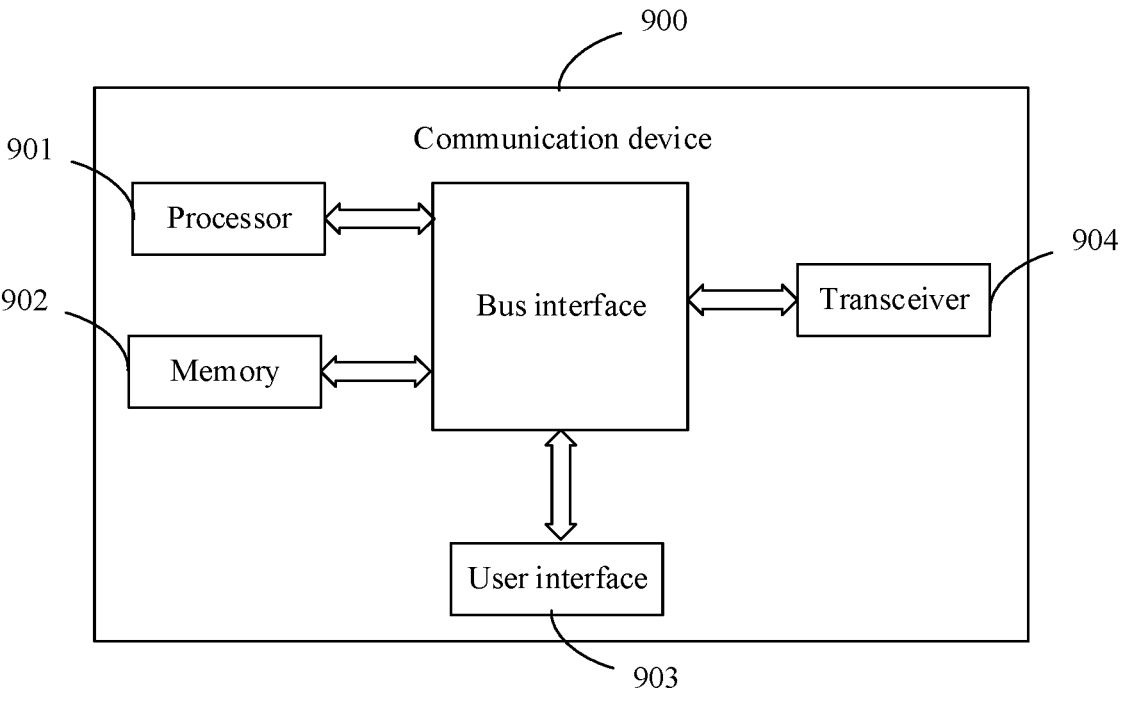
FIG. 9 is a second structural diagram of a communication device according to an embodiment of this application.

FIG. 9 is a second structural diagram of a communication device according to an embodiment of this application.

The communication device 900 includes but is not limited to a processor 901, a memory 902, a user interface 903, a transceiver 904, and a bus interface.

The structure of the communication device shown in FIG. 9 constitutes no limitation on the communication device, and the communication device may include more or fewer components than those shown in the figure, or some components may be combined, or a different component deployment may be used. Details are not described herein again.

In this embodiment of this application, the communication device 900 further includes programs or instructions stored on the memory 902 and executable on the processor 901.

I. The Communication Device 900 Acts as the Above Terminal.

When the programs or the instructions are executed by the processor 901, the following step is implemented:

executing a target process in response to a master cell group (MCG) of the terminal failing in a case that a secondary cell group (SCG) of the terminal is in a suspended state, where the target process is used for requesting to recover at least one of the SCG and the MCG of the terminal.

Optionally, the target process is any one of a radio resource control (RRC) reestablishment process or an SCG recovery process.

Optionally, in a case that the target process is the SCG recovery process, the following step may be further implemented when the programs or the instructions are executed by the processor 901:

transmitting an SCG recovery request message to a first network node through the transceiver 904, where the SCG recovery request message includes at least one of first identification information, second identification information, or third identification information for indicating recovery of the SCG of the terminal; or a cause value for the terminal to perform the target process, where the cause value represents an MCG failure or MCG fast recovery; and the second identification information is obtained by a second network node by truncating the first identification information, and the third identification information is obtained by the terminal by truncating the first identification information.

Optionally, the following step may be further implemented when the programs or instructions are executed by the processor 901:

receiving, through the transceiver 904, a response message for the SCG recovery request message transmitted by the first network node, where the response message carries at least one of SCG configuration information or MCG configuration information.

Optionally, the following step may be further implemented when the programs or instructions are executed by the processor 901:

transmit a target message through the transceiver 904, where the target message is any one of:

the target message is a first SCG recovery completion message in a case that the response message includes the MCG configuration information and the SCG configuration information, where the first SCG recovery completion message is used for indicating a success of SCG recovery of the terminal, and is further used for indicating a success or a failure of MCG recovery of the terminal;

the target message is a second SCG recovery completion message in a case that the response message includes the SCG configuration information, where the second SCG recovery completion message is used for indicating a success of the SCG recovery of the terminal, and is further used for indicating a failure of the MCG recovery of the terminal; or the target message is an SCG recovery failure message in a case that the response message includes the MCG configuration information, where the SCG recovery failure message is used for indicating a failure of the SCG recovery of the terminal, and is further used for indicating a success or a failure of the MCG recovery.

Optionally, the following step may be further implemented when the programs or instructions are executed by the processor 901:

transmitting the target message to the first network node through the transceiver 904.

Optionally, any one of the following steps may be further implemented when the programs or instructions are executed by the processor 901:

transmitting, through the transceiver 904 and the first network node, the target message to a master node (MN) corresponding to the terminal; or directly transmitting, through the transceiver 904, the target message to the MN corresponding to the terminal.

Optionally, the first network node is a network node of any one of:

any cell group in a first cell list;

a first cell group in the first cell list, where a primary secondary cell (PSCell) included in the first cell group satisfies a cell quality threshold;

a second cell group in the first cell list, where a PSCell included in the second cell group is a PSCell having the best cell quality from candidate PSCells included in the first cell list; or a third cell group corresponding to a secondary node (SN) before the SCG of the terminal is suspended, where each of the cell groups includes at least a PSCell.

Optionally, the following step may be further implemented when the programs or instructions are executed by the processor 901:

receiving, through the transceiver 904, SCG suspension configuration information transmitted by a second network node.

Optionally, the SCG suspension configuration information includes at least one of:

first identification information for indicating recovery of the SCG of the terminal;

second identification information for indicating recovery of the SCG of the terminal, where the second identification information is obtained by truncating the first identification information;

a first cell list for indicating recovery of the SCG of the terminal; or a cell quality threshold for indicating recovery of the SCG of the terminal.

Optionally, the first identification information includes at least one of:

a cell-radio network temporary identifier (C-RNTI) used by the terminal in the master cell group (MCG);

a C-RNTI used by the terminal in the SCG; or a resume ID of context information of the SCG of the terminal.

It is to be noted that in this case, the above communication device 900 in this embodiment can achieve the processes in the method embodiment of FIG. 2 in the embodiments of this application, and can achieve the same beneficial effects. In order to avoid repetition, details are not described herein.

II. The Communication Device 900 Acts as the First Network Node.

When the programs or the instructions are executed by the processor 901, the following step is implemented:

executing a target process in response to a master cell group (MCG) of a terminal failing in a case that a secondary cell group (SCG) of the terminal is in a suspended state, where the target process is used for recovering at least one of the SCG and the MCG of the terminal.

Optionally, the target process is any one of a radio resource control (RRC) reestablishment process or an SCG recovery process.

Optionally, in a case that the target process is the SCG recovery process, the following step may be further implemented when the programs or the instructions are executed by the processor 901:

receiving, through the transceiver 904, an SCG recovery request message transmitted by the terminal, where the SCG recovery request message includes at least one of first identification information, second identification information, or third identification information for indicating recovery of the SCG of the terminal; or a cause value for the terminal to perform the target process, where the cause value represents an MCG failure or MCG fast recovery; and the second identification information is obtained by a second network node by truncating the first identification information, and the third identification information is obtained by the terminal by truncating the first identification information.

Optionally, the following step may be further implemented when the programs or instructions are executed by the processor 901:

transmitting a response message for the SCG recovery request message to the terminal through the transceiver 904, where the response message carries at least one of SCG configuration information or MCG configuration information.

Optionally, the following step may be further implemented when the programs or instructions are executed by the processor 901:

receiving, through the transceiver 904, a target message transmitted by the terminal, where the target message is any one of:

the target message is a first SCG recovery completion message in a case that the response message includes the MCG configuration information and the SCG configuration information, where the first SCG recovery completion message is used for indicating a success of SCG recovery of the terminal, and is further used for indicating a success or a failure of MCG recovery of the terminal;

the target message is a second SCG recovery completion message in a case that the response message includes the SCG configuration information, where the second SCG recovery completion message is used for indicating a success of the SCG recovery of the terminal, and is further used for indicating a failure of the MCG recovery of the terminal; or the target message is an SCG recovery failure message in a case that the response message includes the MCG configuration information, where the SCG recovery failure message is used for indicating a failure of the SCG recovery of the terminal, and is further used for indicating a success or a failure of the MCG recovery.

Optionally, the following step may be further implemented when the programs or instructions are executed by the processor 901:

transmitting, through the transceiver 904, the target message to a master node (MN) corresponding to the terminal.

Optionally, any one of the following steps may be further implemented when the programs or instructions are executed by the processor 901:

receiving, through the transceiver 904, an SCG recovery completion message transmitted by the terminal in a case that the response message includes the MCG configuration information and the SCG configuration information; or receiving, through the transceiver 904, an SCG recovery completion message transmitted by the terminal in a case that the response message includes at least the SCG configuration information, where the SCG recovery completion message is further used for indicating a success or a failure of the MCG recovery.

Optionally, the first network node is a network node of any one of:

any cell group in a first cell list;

a first cell group in the first cell list, where a primary secondary cell (PSCell) included in the first cell group satisfies a cell quality threshold;

a second cell group in the first cell list, where a PSCell included in the second cell group is a PSCell having the best cell quality from candidate PSCells included in the first cell list; or a third cell group corresponding to a secondary node (SN) before the SCG of the terminal is suspended, where each of the cell groups includes at least a PSCell.

It is to be noted that in this case, the above communication device 900 in this embodiment can achieve the processes in the method embodiment of FIG. 3 in the embodiments of this application, and can achieve the same beneficial effects. In order to avoid repetition, details are not described herein.

III. The Communication Device 900 Acts as the Second Network Node.

When the programs or the instructions are executed by the processor 901, the following step is implemented:

transmitting SCG suspension configuration information to a terminal.

Optionally, the SCG suspension configuration information includes at least one of:

first identification information for indicating recovery of the SCG of the terminal;

second identification information for indicating recovery of the SCG of the terminal, where the second identification information is obtained by truncating the first identification information;

a first cell list for indicating recovery of the SCG of the terminal; or a cell quality threshold for indicating recovery of the SCG of the terminal.

Optionally, the first identification information includes at least one of:

a cell-radio network temporary identifier (C-RNTI) used by the terminal in the master cell group (MCG);

a C-RNTI used by the terminal in the SCG; or a resume ID of context information of the SCG of the terminal.

It is to be noted that in this case, the above communication device 900 in this embodiment can achieve the processes in the method embodiment of FIG. 4 in the embodiments of this application, and can achieve the same beneficial effects. In order to avoid repetition, details are not described herein.

In FIG. 9, a bus architecture may include any number of interconnected buses and bridges, which links together various circuits such as one or more processors represented by the processor 901 and memories represented by the memory 902. The bus architecture may further link together a plurality of other circuits such as a peripheral device, a voltage regulator, and a power management circuit. This is well known in the art and therefore is not further described herein. The bus interface provides an interface.

The transceiver 904 may include a plurality of elements, that is, include a transmitter and a receiver, and provides units configured to communicate with a plurality of other apparatuses on a transmission or receiving medium.

For different user equipment, the user interface 903 may be an interface that may be connected to external and internal devices. The connected devices include but are not limited to a keyboard, a display, a speaker, a microphone, and a joystick.

The memory 902 may be configured to store a software program or an instruction as well as various data. The memory 902 may mainly include a program or instruction storage area and a data storage area. The program or instruction storage area may store an operating system, an application or an instruction required for at least one function (such as a sound playback function or an image playback function), and the like. In addition, the memory 902 may include a high-speed random access memory, and may further include a non-volatile memory. The non-volatile memory may be a read-only memory (ROM), a programmable ROM (PROM), an erasable PROM (EPROM), an electrically EPROM (EEPROM), or a flash memory. For example, the non-volatile memory may include at least one magnetic disk storage device, a flash memory device, or other non-volatile solid-state storage devices.

The processor 901 may include one or more processing units. Optionally, an application processor and a modem processor may be integrated on the processor 901. The application processor mainly processes an operating system, a user interface, an application or an instruction, and the like. The modem processor mainly processes wireless communication, such as a baseband processor. It may be understood that the modem processor may alternatively not be integrated on the processor 901.

An embodiment of this application further provides a readable storage medium. The readable storage medium stores program or instructions. When the programs or instructions are executed by a processor, the process of the embodiment of the above cell group processing method, and the same technical effects can be achieved. In order to avoid repetition, details are not described herein.

The processor is a processor in the terminal described in the above embodiments. The readable storage medium includes a computer readable storage medium, such as a computer read-only memory (ROM), a random access memory (RAM), a magnetic disk, or an optical disk.

An embodiment of this application further provides a chip. The chip includes a processor and a communication interface. The communication interface is coupled to the processor. The processor is configured to execute programs or instructions to implement the processes of the embodiment of the above cell group processing method, and can achieve the same technical effects. In order to avoid repetition, details are not described herein.

It should be understood that, the chip mentioned in this embodiment of this application may also be referred to as a system-level chip, a system chip, a chip system, a system on chip, or the like.

It may be understood that, the embodiments described in the present disclosure may be implemented by using hardware, software, firmware, middleware, microcode, or a combination thereof. For hardware implementation, a module, a unit, a sub module, a sub unit may be implemented in one or more application specific integrated circuits (ASIC), a digital signal processor (Digital Signal Processing, DSP), a digital signal processing device (DSPD), a programmable logic device (PLD), a field-programmable gate array (FPGA), a general purpose processor, a controller, a microcontroller, a microprocessor, and other electronic units configured to execute the functions described in this application, or a combination thereof.

It should be noted that the terms "include", "comprise", or any other variants thereof in this specification are intended to cover a non-exclusive inclusion, so that a process, method, object, or apparatus including a series of elements not only include those elements, but also include other elements which are not clearly listed, or include inherent elements of the process, method, object, or apparatus. Without more limitations, elements defined by the sentence "including one" does not exclude that there are still another same element in the process, method, object, or apparatus including the element. In addition, it should be pointed out that the scope of the methods and apparatuses in the implementations of this application is not limited to performing functions in an order shown or discussed, but may further include performing functions in a basically simultaneous manner or a converse order according to the involved functions. For example, the described methods may be performed in an order different from the described order, and various steps may be added, omitted, or combined. In addition, features described with reference to some examples may be combined in other examples.

Through the descriptions of the foregoing implementations, a person skilled in the art may clearly understand that the methods in the foregoing embodiments may be implemented by means of software and a necessary general hardware platform, and certainly, may also be implemented by hardware, but in many cases, the former manner is a better implementation. Based on such an understanding, the technical solutions of this application essentially or the part contributing to the prior art may be embodied in a form of a software product. The computer software product is stored in a storage medium (such as a ROM/RAM, a magnetic disk, or an optical disc) and includes several instructions to enable a terminal (which may be a mobile phone, a computer, a server, an air conditioner, a network device, or the like) to perform the methods described in the embodiments of this application.

The embodiments of this application are described above with reference to the accompanying drawings. However, this application is not limited to the foregoing specific implementations. The foregoing specific implementations are only exemplary and not limitative. Enlightened by this application, a person of ordinary skill in the art may further make many variations without departing from the idea of this application and the protection scope of the claims. All of the variations fall within the protection scope of this application.

What is claimed is:

1. A cell group processing method performed by a terminal, comprising:

executing a target process in response to a master cell group (MCG) of a terminal failing in a case that a secondary cell group (SCG) of the terminal is in a suspended state, wherein the target process is used for requesting to recover at least one of the SCG and the MCG of the terminal;

wherein in a case that the target process is the SCG recovery process, the executing a target process comprises:

transmitting an SCG recovery request message to a first network node, wherein the SCG recovery request message comprises: second identification information or third identification information for indicating recovery of the SCG of the terminal; and the second identification information is obtained by a second network node by truncating first identification information, and the third identification information is obtained by the terminal by truncating the first identification information;

wherein after the transmitting an SCG recovery request message to a first network node, the method further comprises:

receiving a response message for the SCG recovery request message transmitted by the first network node, wherein the response message carries at least one of SCG configuration information or MCG configuration information.

2. The method according to claim 1, wherein after the receiving SCG recovery configuration information transmitted by the first network node, the method further comprises:

transmitting a target message, wherein the target message is any one of:

the target message is a first SCG recovery completion message in a case that the response message comprises the MCG configuration information and the SCG configuration information, wherein the first SCG recovery completion message is used for indicating a success of SCG recovery of the terminal, and is further used for indicating a success or a failure of MCG recovery of the terminal;

the target message is a second SCG recovery completion message in a case that the response message comprises the SCG configuration information, wherein the second SCG recovery completion message is used for indicating a success of the SCG recovery of the terminal, and is further used for indicating a failure of the MCG recovery of the terminal; or the target message is an SCG recovery failure message in a case that the response message comprises the MCG configuration information, wherein the SCG recovery failure message is used for indicating a failure of the SCG recovery of the terminal, and is further used for indicating a success or a failure of the MCG recovery.

3. The method according to claim 2, wherein the transmitting a target message comprises:

transmitting the target message to the first network node, or wherein the transmitting a target message comprises any one of:

transmitting, through the first network node, the target message to a master node (MN) corresponding to the terminal; or directly transmitting the target message to the MN corresponding to the terminal.

4. The method according to claim 1, wherein the first network node is a network node of any one of:

any cell group in a first cell list;

a first cell group in the first cell list, wherein a primary secondary cell (PSCell) comprised in the first cell group satisfies a cell quality threshold;

a second cell group in the first cell list, wherein a PSCell comprised in the second cell group is a PSCell having the best cell quality from candidate PSCells comprised in the first cell list; or a third cell group corresponding to a secondary node (SN) before the SCG of the terminal is suspended, wherein each of the cell groups comprises at least a PSCell.

5. The method according to claim 1, wherein before the executing a target process in response to a master cell group (MCG) of the terminal failing in a case that a secondary cell group (SCG) of the terminal is in a suspended state, the method further comprises:

receiving SCG suspension configuration information transmitted by a second network node.

6. The method according to claim 5, wherein the SCG suspension configuration information comprises at least one of:

first identification information for indicating recovery of the SCG of the terminal;

second identification information for indicating recovery of the SCG of the terminal, wherein the second identification information is obtained by truncating the first identification information;

a first cell list for indicating recovery of the SCG of the terminal; or a cell quality threshold for indicating recovery of the SCG of the terminal, wherein the first identification information comprises at least one of:

a cell-radio network temporary identifier (C-RNTI) used by the terminal in the master cell group (MCG);

a C-RNTI used by the terminal in the SCG; or a resume ID of context information of the SCG of the terminal.

7. A communication device, comprising:

a processor; and a memory storing programs or instructions that is executable on the processor, wherein the programs or the instructions, when executed by the processor, cause the communication device to perform the cell group processing method according to claim 1.

8. A cell group processing method performed by a first network node, comprising:

executing a target process in response to a master cell group (MCG) of a terminal failing in a case that a secondary cell group (SCG) of the terminal is in a suspended state, wherein the target process is used for recovering at least one of the SCG and the MCG of the terminal;

wherein in a case that the target process is the SCG recovery process, the executing a target process comprises:

receiving an SCG recovery request message transmitted by the terminal, wherein the SCG recovery request message comprises second identification information, or third identification information for indicating recovery of the SCG of the terminal; and the second identification information is obtained by a second network node by truncating first identification information, and the third identification information is obtained by the terminal by truncating the first identification information;

wherein after the receiving an SCG recovery request message transmitted by the terminal, the method further comprises:

transmitting a response message for the SCG recovery request message to the terminal, wherein the response message carries at least one of SCG configuration information or MCG configuration information.

9. The method according to claim 8, wherein after the transmitting a response message for the SCG recovery request message to the terminal, the method further comprises:

receiving a target message transmitted by the terminal, wherein the target message is any one of:

the target message is a first SCG recovery completion message in a case that the response message comprises the MCG configuration information and the SCG configuration information, wherein the first SCG recovery completion message is used for indicating a success of SCG recovery of the terminal, and is further used for indicating a success or a failure of MCG recovery of the terminal;

the target message is a second SCG recovery completion message in a case that the response message comprises the SCG configuration information, wherein the second SCG recovery completion message is used for indicating a success of the SCG recovery of the terminal, and is further used for indicating a failure of the MCG recovery of the terminal; or the target message is an SCG recovery failure message in a case that the response message comprises the MCG configuration information, wherein the SCG recovery failure message is used for indicating a failure of the SCG recovery of the terminal, and is further used for indicating a success or a failure of the MCG recovery.

10. The method according to claim 9, wherein after the receiving a target message transmitted by the terminal, the method further comprises:

transmitting the target message to a master node (MN) corresponding to the terminal.

11. The method according to claim 9, wherein the receiving a target message transmitted by the terminal comprises any one of:

receiving an SCG recovery completion message transmitted by the terminal in a case that the response message comprises the MCG configuration information and the SCG configuration information; or receiving an SCG recovery completion message transmitted by the terminal in a case that the response message comprises at least the SCG configuration information, wherein the SCG recovery completion message is further used for indicating a success or a failure of the MCG recovery.

12. The method according to claim 8, wherein the first network node is a network node of any one of:

any cell group in a first cell list;

a first cell group in the first cell list, wherein a primary secondary cell (PSCell) comprised in the first cell group satisfies a cell quality threshold;

a second cell group in the first cell list, wherein a PSCell comprised in the second cell group is a PSCell having the best cell quality from candidate PSCells comprised in the first cell list; or a third cell group corresponding to a secondary node (SN) before the SCG of the terminal is suspended, wherein each of the cell groups comprises at least a PSCell.

13. A communication device, comprising:

a processor; and a memory storing programs or instructions that is executable on the processor, wherein the programs or the instructions, when executed by the processor, cause the communication device to perform the cell group processing method according to claim 9.

* * * * *